(12) United States Patent
Shieh

(10) Patent No.: US 7,889,928 B2
(45) Date of Patent: Feb. 15, 2011

(54) VIDEO-BASED HANDWRITING INPUT

(75) Inventor: Kelvin Shieh, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 11/567,755

(22) Filed: Dec. 7, 2006

(65) Prior Publication Data

US 2007/0154116 A1    Jul. 5, 2007

(30) Foreign Application Priority Data

Dec. 30, 2005    (TW) .............................. 94147480 A

(51) Int. Cl.
G06K 9/00      (2006.01)
G06K 9/22      (2006.01)
G06K 7/10      (2006.01)
G06K 11/06    (2006.01)
G06F 3/043    (2006.01)
G06F 3/033    (2006.01)
G06F 3/041    (2006.01)
G06C 21/00    (2006.01)

(52) U.S. Cl. ........................ 382/188; 382/314; 382/321; 178/18.04; 178/19.02

(58) Field of Classification Search ........................ None
See application file for complete search history.

(56) References Cited

U.S. PATENT DOCUMENTS

| | | | | |
|---|---|---|---|---|
| 3,673,579 A | * | 6/1972 | Graven | ........................ 365/114 |
| 4,914,709 A | * | 4/1990 | Rudak | ........................ 382/311 |
| 5,321,770 A | * | 6/1994 | Huttenlocher et al. | ....... 382/174 |
| 5,529,501 A | * | 6/1996 | Maruyama | ................... 434/408 |
| 5,566,678 A | * | 10/1996 | Cadwell | ..................... 600/544 |
| 5,798,509 A | * | 8/1998 | Swanson et al. | ....... 235/462.15 |
| 6,300,955 B1 | * | 10/2001 | Zamir | ........................ 382/283 |
| 6,568,593 B2 | * | 5/2003 | Hetzer | ........................ 235/385 |
| 6,629,107 B1 | * | 9/2003 | Ouchi et al. | ........................ 1/1 |
| 6,636,635 B2 | * | 10/2003 | Matsugu | ..................... 382/218 |
| 6,720,985 B1 | | 4/2004 | Silverbrook et al. | |
| 6,782,144 B2 | * | 8/2004 | Bellavita et al. | ............ 382/310 |
| 7,672,513 B2 | * | 3/2010 | Bjorklund et al. | ........... 382/188 |
| 2002/0034412 A1 | * | 3/2002 | Lee | ................................ 401/7 |

(Continued)

FOREIGN PATENT DOCUMENTS

EP    1248227 A    10/2002

(Continued)

Primary Examiner—Vikkram Bali
Assistant Examiner—Michelle Entezari
(74) Attorney, Agent, or Firm—Dillon & Yudell LLP

(57) ABSTRACT

Disclosed is a method and an apparatus, as well as a computer recording medium for handwriting input. The invention is implemented by capturing images including raw strokes with a digital camera and receiving writing sounds with a microphone, when a user writes on a writing surface with a stylus having a special mark (such as special color point or light point), said images and sounds are time-stamped; extracting images of raw stroke by comparing the captured images with the special mark on the stylus; and retrieving "effective strokes" from the raw strokes by utilizing the received writing sounds. Moreover, the invention discloses a low cost, wireless method and apparatus for handwriting input which enables an user to write on a paper without a touch sensor provided for a computer system (such as Notebook and PDA etc.) equipped with an embedded digital camera.

48 Claims, 8 Drawing Sheets

U.S. PATENT DOCUMENTS

| | | | |
|---|---|---|---|
| 2002/0048404 A1* | 4/2002 | Fahraeus et al. | 382/188 |
| 2002/0163511 A1 | 11/2002 | Sekendur | |
| 2003/0054868 A1 | 3/2003 | Paulsen et al. | |
| 2003/0084215 A1 | 5/2003 | Kao | |
| 2003/0095708 A1 | 5/2003 | Pittel | |
| 2003/0106985 A1* | 6/2003 | Fagin et al. | 250/208.1 |
| 2004/0047505 A1* | 3/2004 | Ghassabian | 382/186 |
| 2004/0153969 A1* | 8/2004 | Rhodes | 715/515 |
| 2004/0201602 A1 | 10/2004 | Mody et al. | |
| 2005/0069205 A1 | 5/2005 | Khomo | |
| 2005/0111735 A1 | 5/2005 | Sheinin | |
| 2005/0102620 A1 | 12/2005 | Seto et al. | |
| 2005/0281437 A1* | 12/2005 | Fruchter et al. | 382/113 |
| 2006/0161992 A1* | 7/2006 | Kempf | 726/34 |
| 2006/0182343 A1* | 8/2006 | Lin et al. | 382/181 |
| 2006/0274948 A1* | 12/2006 | Wamg et al. | 382/202 |
| 2008/0209508 A1* | 8/2008 | Albarran Moyo et al. | 726/2 |

FOREIGN PATENT DOCUMENTS

| | | |
|---|---|---|
| GB | 2 353 501 A | 2/2001 |
| GB | 2353501 A | 2/2001 |
| TW | 373389 | 11/1999 |
| TW | 554329 | 9/2003 |
| WO | 9838595 A | 9/1998 |
| WO | 03044726 A | 5/2003 |
| WO | WO2004023382 A1 | 3/2004 |

* cited by examiner

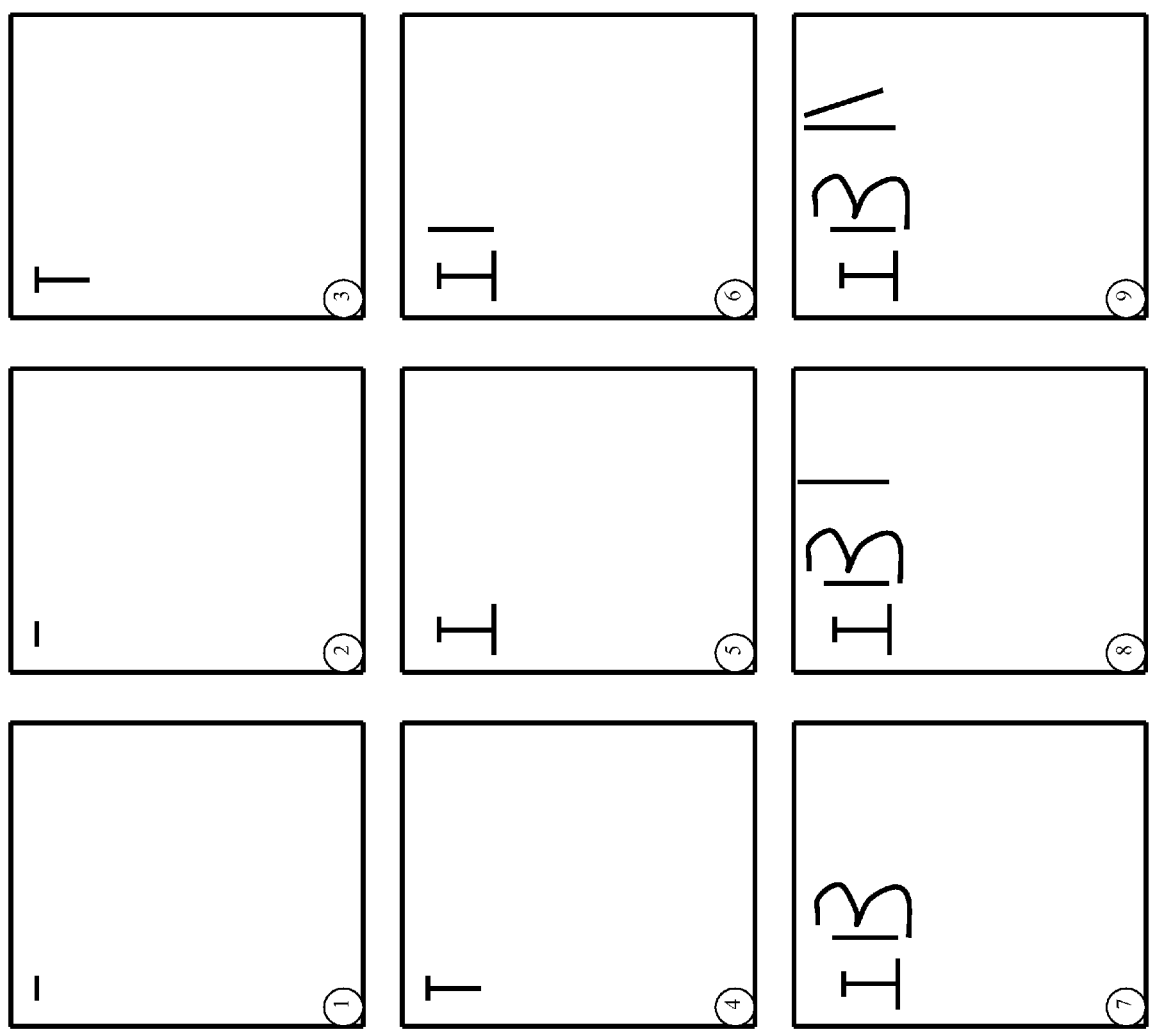

VIDEO-BASED HANDWRITING INPUT

CROSS REFERENCE TO RELATED APPLICATIONS

This application claims priority to Taiwan Patent Application No. 94147480 entitled "VIDEO-BASED HANDWRITING INPUT METHOD AND APPARATUS", filed on Dec. 30, 2005, which is incorporated herein by reference and assigned to the assignee herein.

FIELD OF INVENTION

The present invention generally relates to handwriting input methods and apparatus, and more particularly, to a handwriting input methods and apparatus by capturing images data of real-time handwriting strokes with a digital camera for on-line character recognition (OLCR).

BACKGROUND OF THE INVENTION

With the quick development of computer technologies, there appear many information processing devices for accepting users' handwriting input with a handwriting recognition subsystem, such as personal digital assistants PDA or hand portable computers HPC. A handwriting recognition subsystem usually are usefully in the environment of inputting texts into a small mobile device like PDA, or inputting hard-to-enter characters like Chinese to a computer. Users can input handwritten data and symbols into computers by means of pen-like devices. Correspondingly, there appear many handwritten characters recognition devices, which can recognize a user's handwriting input.

In the field of handwriting input, two approaches to handwriting character recognition are known as on-line character recognition (OLCR) and optical character recognition (OCR). The OCR approach is sometimes also referred to as off-line handwriting recognition. In general, the on-line character recognition (OLCR) technique employs dynamic handwriting information, while the off-line handwriting recognition employs static handwriting information. All OCR systems generally use an input device, such as an optical scanner, for reading text from existing documents into a computer as an image file, process the image file by data perceiving and data re-construction (e.g. analyze the patterns and identify the characters they represent) to produce a text file for editing or other use later. Relative to the OLCR technique, as the OCR technique cannot obtain real-time dynamic handwriting information such as stroke direction, stroke order, pen tip pressure or speed etc as features, the recognition rate will be affected.

The OLCR technique uses a stylus as a handwriting input device to write characters each by each on a digitizing tablet, and then recognizes these characters by a recognition software. As OLCR technique employs dynamic handwriting information, such as stroke direction, stroke order, tip pressure or speed etc as features, it provides generally better recognition accuracy, and is used widely for current handwriting input devices.

At present, conventional handwriting input devices utilizing OLCR technique usually request a touch sensitive pad which incorporates either magnetic sensor or pressure sensor to sense and record the pen strokes that are touching on the pads surface, e.g. digitizing tablet. The conventional digitizing tablet usually has a wire connecting an external smart stylus.

The IBM's ThinkScribe is a device integrating a handwriting digitizer having a digitizing tablet with a traditional paper-based recording system. The digitizing tablet includes an active area capable of receiving electromagnetic signals from a radio frequency coupled stylus. This device records a user's handwriting input in strokes and associated timing and can reproduce the user's handwriting input according to the original timing information. A user may write the documents to be transmitted on the digitizing tablet or paper. The digitizing tablet generates a data flow representative of strokes and the associated events, and records the data flow in a nonvolatile memory. The associated events in the data flow may be generally categorized as being either automatically generated by the input device or as being user invoked. Automatically generated events are events which occur and are detected and recorded without specific input from the user. For example, there may be defined a pen-down event which indicates that the stylus was brought into contact with the writing surface and a pen-up event which indicates that the stylus was lifted from the writing surface. A "ink trace" may thus be defined as a series of pen coordinates recorded between a pen-down and a pen-up event.

All the input devices mentioned above require a touch sensitive pad which incorporates either magnetic sensor or pressure sensor to sense and record the pen strokes that are touching on the pads surface. The pad is additional cost to an existing PDA or a personal computer. The pad is also large in size which either is difficult to carry, or it occupies the screen area when it is built onto a PDA and in operation. The pad usually has a wire connecting the pad to the computer, and a wire connecting the pen to the pad. The situation sometimes is a mess.

In other types of recognition systems, a pure digital camera input may be used for the sake of recognition, however, the processing and results may not be as precise.

As many computer systems (e.g. notebook PC, pervasive device, PDA etc.) are increasingly entering market equipped with an embedded digital camera of relatively high resolution, it would be advantageous to provide digital video data with the digital camera for use in the handwriting recognition process in such pervasive device. Accordingly, there is a need to provide a easier and a low cost solution which enables an user to write on a paper without a touch sensor and a wire connecting the sensor to a computer (or a pervasive device and the like) and a wire connecting a stylus (or a pen) to the sensor, but equipped with a low cost digital camera functioning to overcome the known drawbacks mentioned above.

SUMMARY OF THE INVENTION

It is thus an object of the present invention to provide a low cost, wireless method and apparatus for handwriting input which enables an user to write on a paper without a touch sensor provided for a computer system (such as Notebook and PDA etc.) equipped with an embedded digital camera.

The invention discloses to retrieve an accumulated locus (e.g. raw strokes) of the special mark (a special color point or a light point), not an ink locus, and then to retrieve the effective strokes from the raw strokes. Thus, it is another object of the present invention to provide a method and apparatus for handwriting input which can be used for a real paper environment or for a non-paper environment on which there is not any ink locus.

According to the first aspect of the invention, there is provided a method and apparatus which is implemented by capturing images including raw strokes and receiving writing sounds, when a user writes on a writing surface with a stylus having a special mark (e.g. a special color point or a light point), said images and sounds being time-stamped; extracting the images of raw strokes by comparing the captured images with the special mark on the stylus; and retrieving effective strokes from the raw strokes by utilizing the received writing sounds.

According to the first aspect of the invention, there is provided a method and apparatus which is implemented by capturing images including effective strokes and receiving writing sounds, when a user writes on a writing surface with a stylus having a special mark, said images and sounds being time-stamped; removing images data corresponding to sound-non-existing periods and recording the remaining images data; and retrieving effective strokes by comparing said recorded images with the special mark on the stylus.

According to the first aspect of the invention, there is provided a method and apparatus which is implemented by enabling a digital image capturing means for capturing images including effective strokes, when a user writes on a writing surface with a stylus having a special mark and said stylus is brought into contact with the writing surface, said images being time-stamped; disabling said digital image capturing means when said stylus is lifted from the writing surface; and extracting effective stroke by comparing the captured images with the special mark on the stylus.

BRIEF DESCRIPTION OF THE DRAWINGS

In order to further understand of the invention and advantages thereof, the following detailed description of the disclosed embodiment will be considered in conjunction with the accompanying drawings, in which:

FIG. 8 depicts the results of processing the raw strokes shown in FIG. 6 via the step 450, in which there are only the solid lines in FIG. 6 stored in a storage.

DETAILED DESCRIPTION OF THE INVENTION

Terminology

The following terms will be used throughout the detailed description:

Strokes—the track of movement of a pen or stylus. The strokes comprise text, marks, lines, and/or shapes written on or in proximity to a writing surface or a surface of a paper, as the solid lines and broken lines of the raw stroke image 700 shown in FIG. 7.

Figure 7:
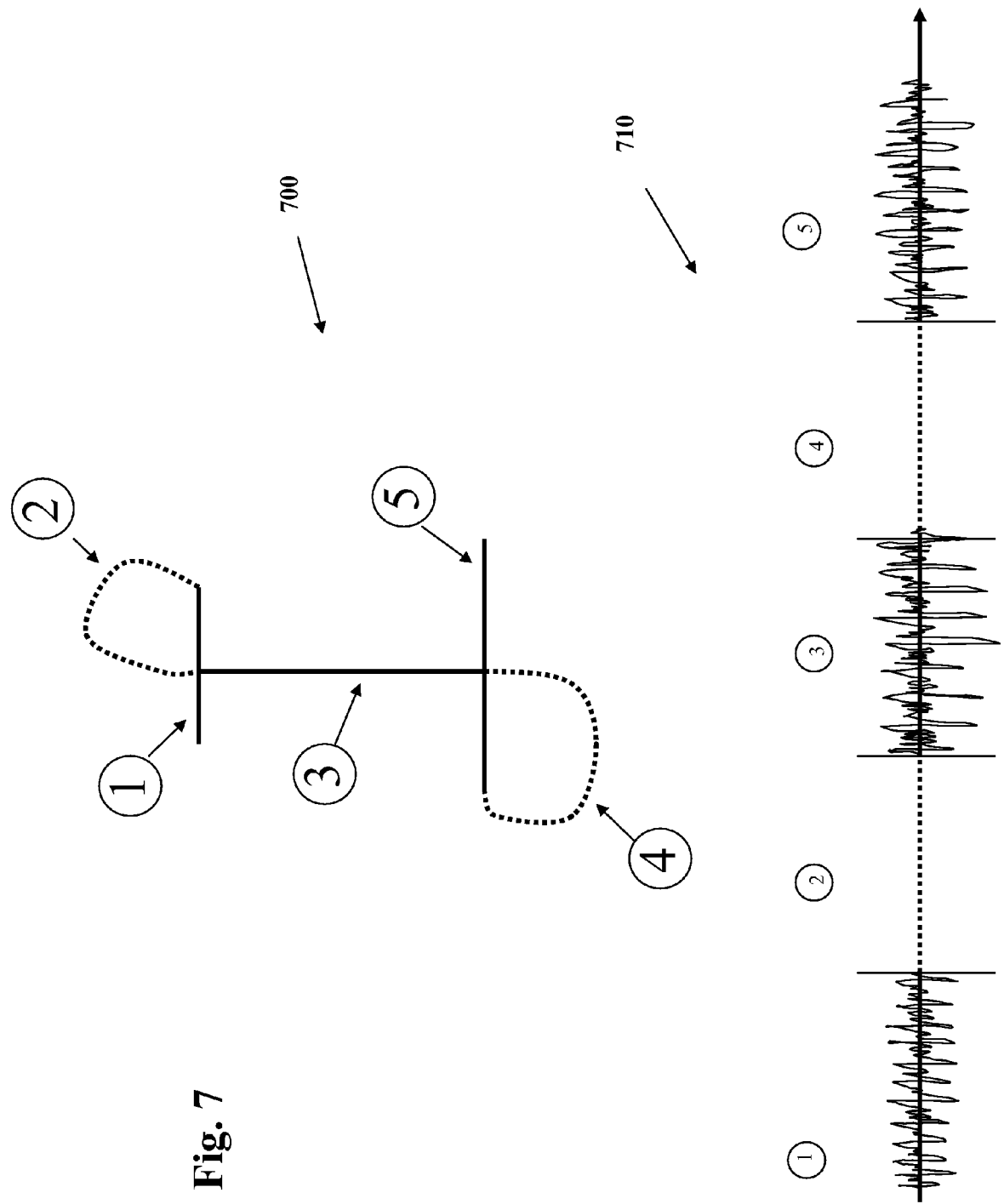
FIG. 7 depicts an example of performing step 450.

Ink traces—the ink traces comprise text written on a surface of a paper, as the solid lines of the raw stroke image 700 shown in FIG. 7, indicative of the character itself.

The following will describe the embodiment of the present invention. The disclosed embodiment is only for illustration, thus it will be understood by those skilled in the art that there are many modifications and changes made therein without departing from the spirit and scope of the invention. Throughout the appended drawings, like features are identified by like reference numerals.

Figure 1:
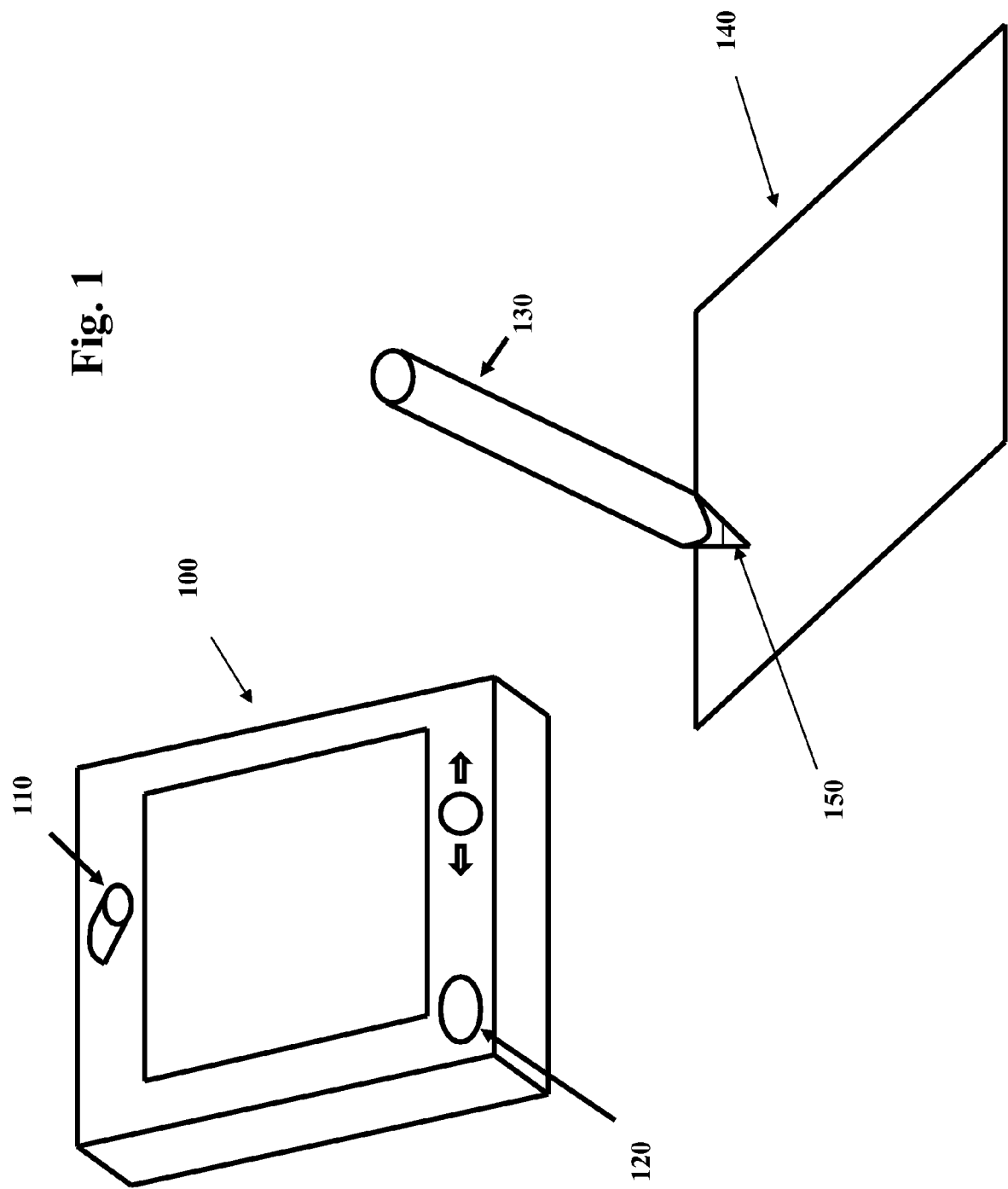
FIG. 1 & FIG. 2 respectively illustrate different information processing systems implementing the present invention.
Figure 2:
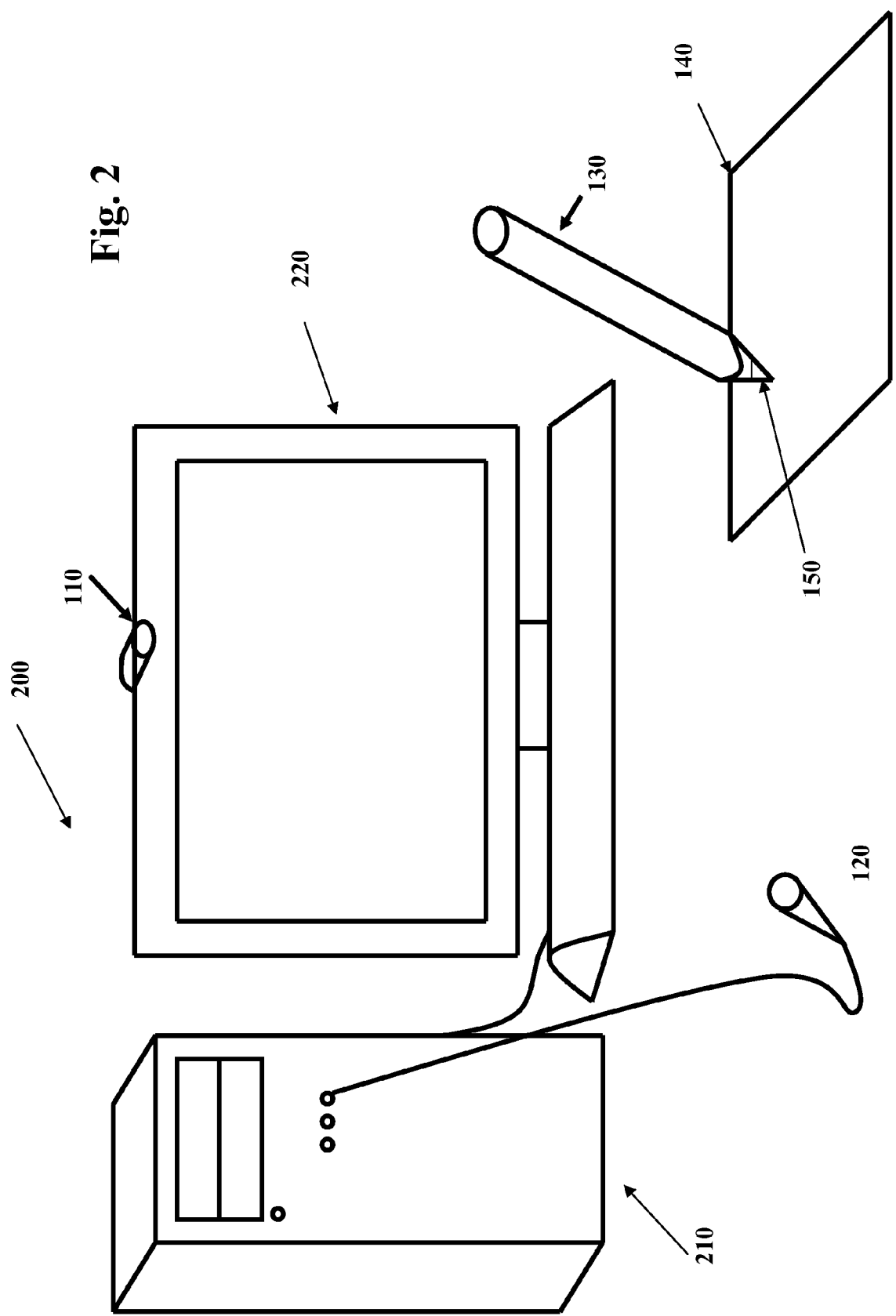

FIG. 1 & FIG. 2 respectively illustrate different information processing systems implementing the present invention. In FIG. 1, a PDA 100 or a similar pervasive computing device includes an embedded digital camera 110, a built-in microphone 120 and a handwriting input module (not shown). When a user writes with a stylus 130 on a writing surface or a paper 140 within a pre-defined area, the digital camera 110 will capture images including real-time strokes within the pre-defined area. The module includes function of producing dynamic video data output corresponding to the images of the real-time strokes of the movement of the stylus 130. Similarly, when the user writes within a pre-defined area on the writing surface, the stylus 130 touches the writing surface and always produces sounds. The microphone 120 picks up the sounds of the movement of the stylus 130 on the writing surface. The module includes function of producing audio data output corresponding to the sounds. The tip 150 of the stylus 130 includes a special color for the module to extract the images of the real-time raw strokes from the images captured by the digital camera 110. A PDA or a similar pervasive device can receive the images captured by the digital camera 110 and the sounds picked up by the microphone 120, extract the images of the real-time raw strokes and then retrieve the effective strokes therefrom for recognition according to the handwriting input module of the present invention shown in the FIG. 4.

Similarly, the computer 200 of FIG. 2 includes a host 210, screen 220 and a handwriting input module (not shown). There is a digital camera 110 on the screen 220 to capture images of real-time raw strokes for producing corresponding dynamic video data for processing. The host 210 may include a microphone 120 to pick up sounds when the stylus writes on the paper 140 for producing corresponding audio data.

Figure 3:
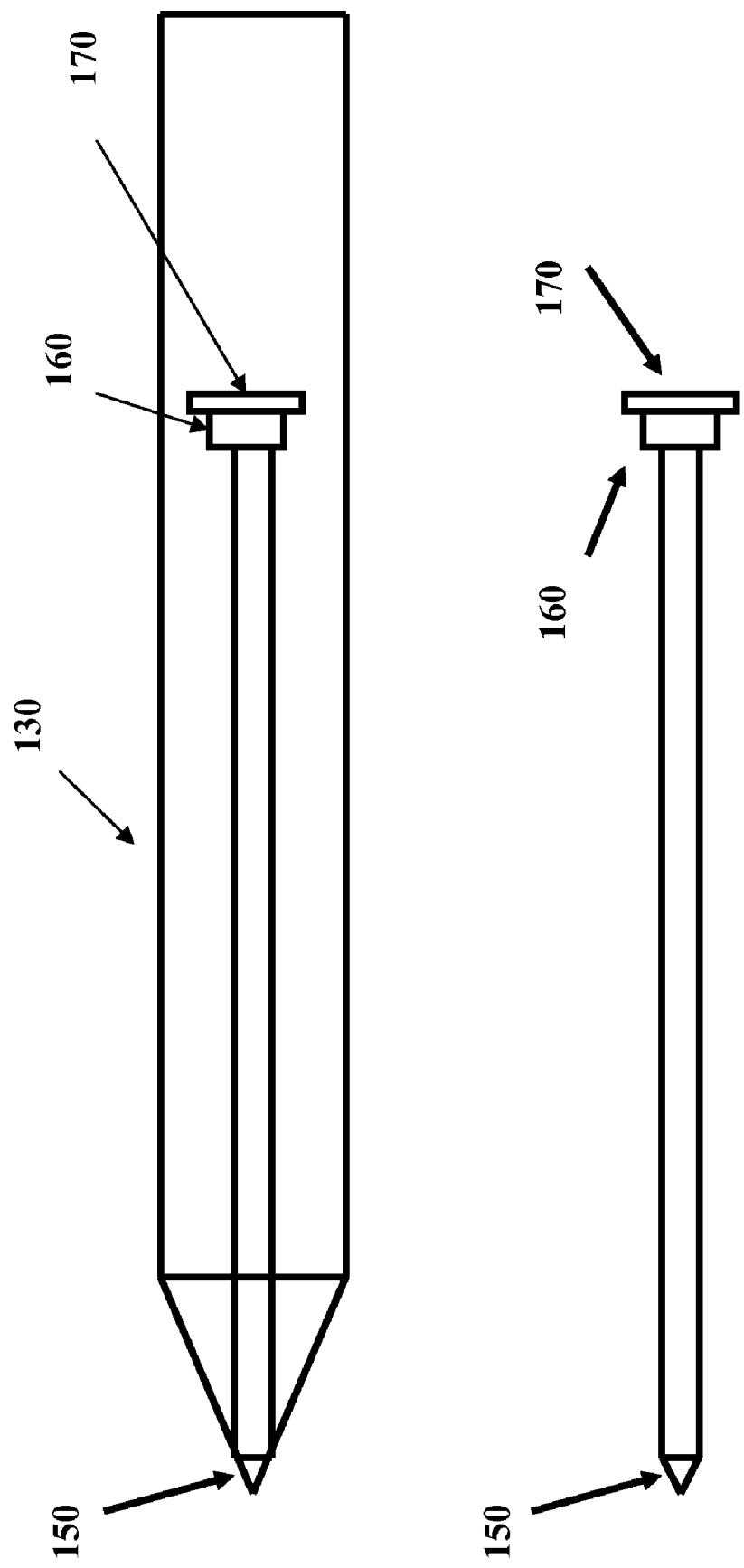
FIG. 3 shows the stylus 130 used for the present invention.

FIG. 3 shows the stylus 130 used for the invention. The stylus 130 is basically a pen (inked pen) having a special color point, which can write on a real paper, or a plastic stylus having a special color point, which can not write on a real paper to leave ink traces. The special color point is preferably positioned at the tip 150 of the stylus. The special color point is provided as a reference for the handwriting input module to extract desired real-time raw strokes from images captured by the digital camera 110. As the purpose of the special color is provided as a reference to extract images of the real-time strokes from images captured by the digital camera 110, it may be any colors different from the colors of writing environment. The special color is preferably designed to be changed by the user. The special color point is not limited to the position of tip 150, when implementing the present invention. By the way, the stylus 130 may also provide a light point (e.g. LED light) proximity to the tip 150 as a reference to extract images of the real-time strokes from images captured by the digital camera 110.

The stylus 130 may also include a micro-switch 160 and an embedded buzzer 170. When the stylus 130 is brought into contact with the writing surface, the micro-switch 160 is turned on to enable the buzzer 170 and generate sounds at a given frequency. Such kind of stylus is required only when the sensitivity of the microphone 120 on a computer system, such as a handheld computer, a PDA or any similar pervasive computing devices, is poor.

Figure 4:
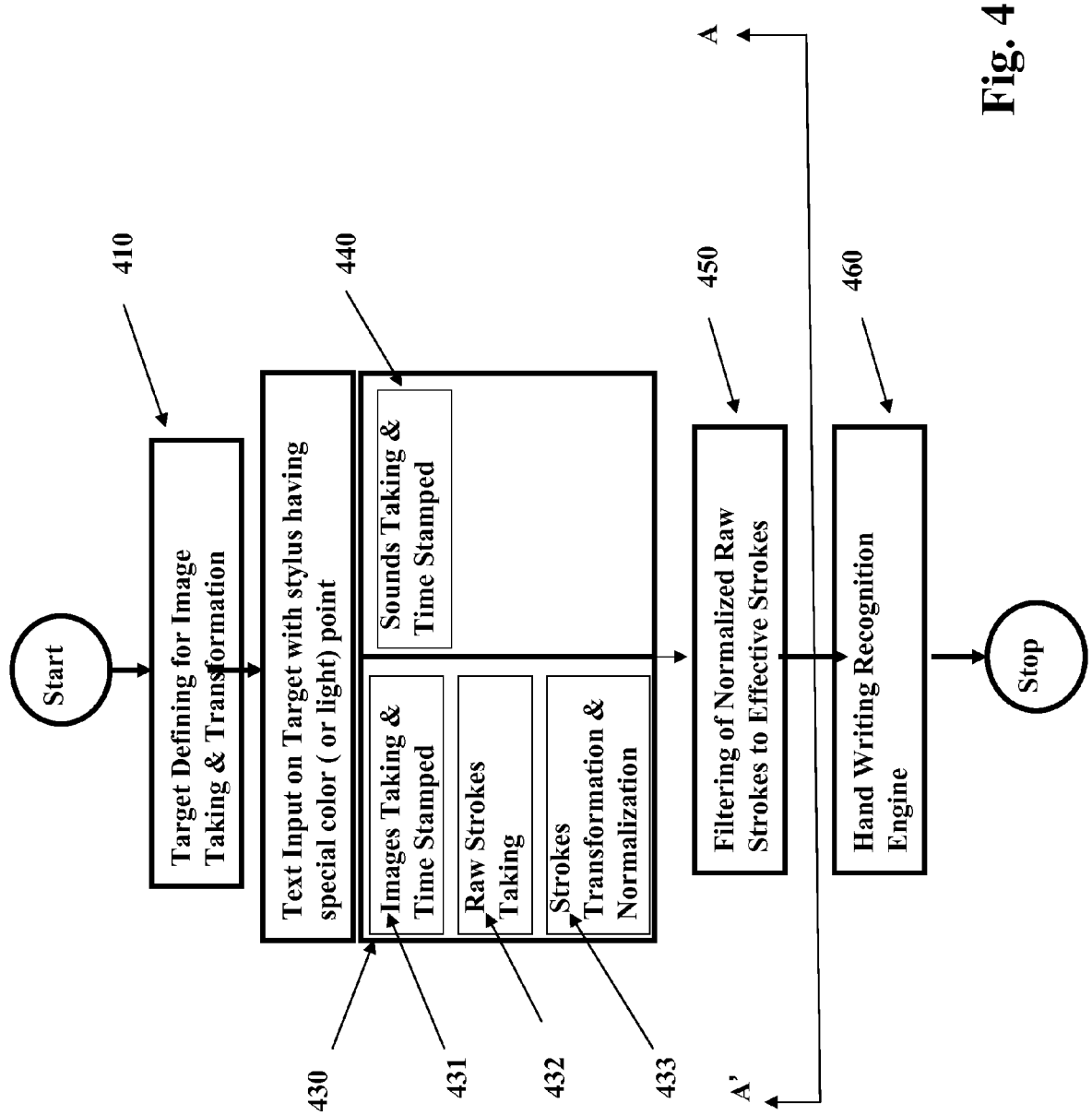
FIG. 4 depicts the flowchart of handwriting input process according to the present invention.
Figure 5:
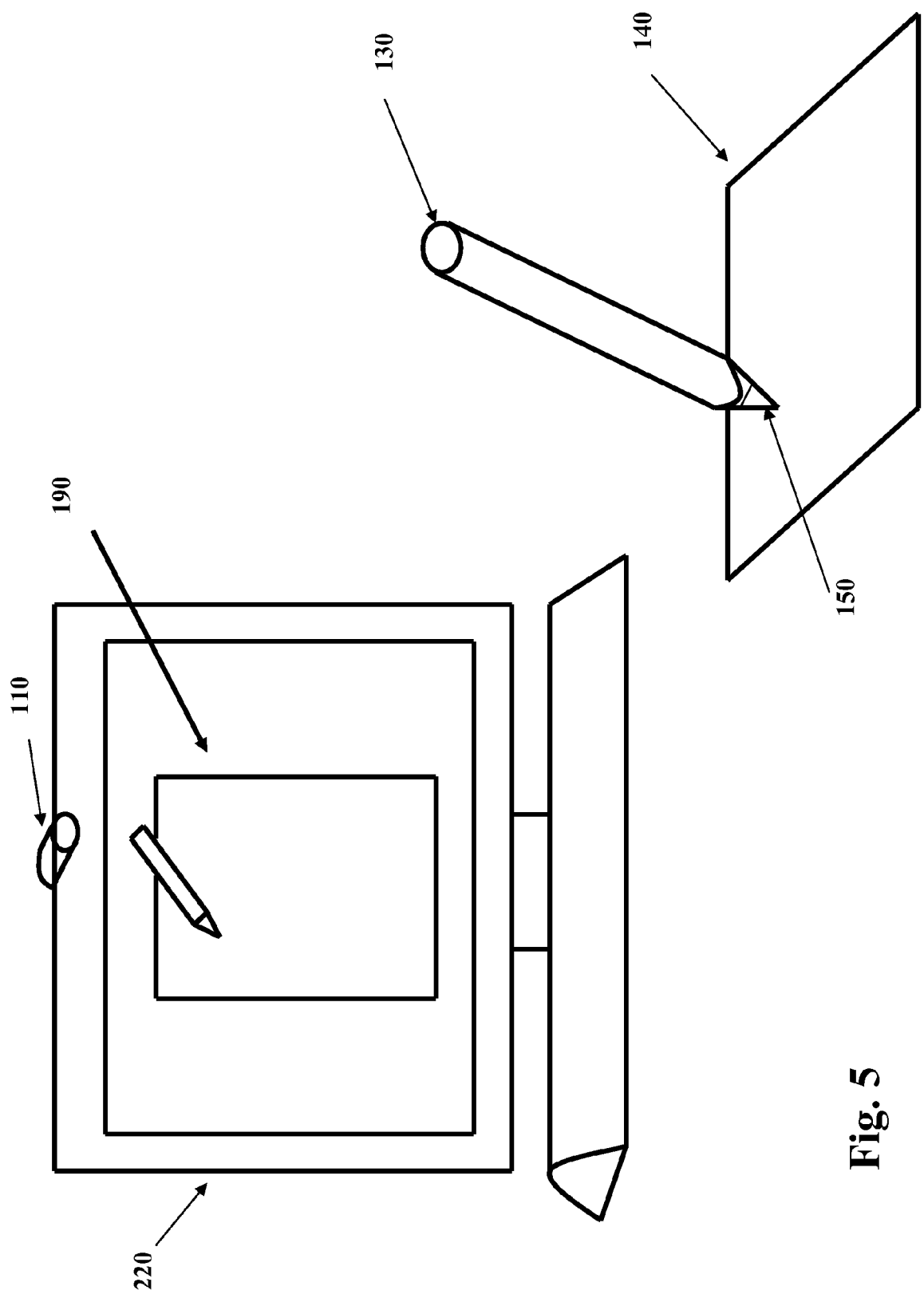
FIG. 5 depicts that the user can interact with a computer system via screen to define the target area on the writing surface.

FIG. 4 depicts the flowchart of handwriting input process according to the present invention. A-A' portion shown in the FIG. 4 is the input module according to the present invention. At first, at step 410, a user performs a step of defining target area prior to handwriting input to define a target area on a writing surface (140) for the user's handwriting input. The target area is the effective area for digital camera (110) capturing images. As shown in FIG. 5, the user can interact with a computer system via screen (220) to define the target area on the writing surface. Moreover, the image of a rectangle on the writing surface taken by the digital camera will become a trapezoid. Accordingly, after defining the target area on the writing surface, a simple mathematical transformation can be performed to transform the trapezoid back into a rectangle (190) shown in the screen (220). The mathematical transformation is easily accomplished by those persons skilled in the art. As such, after obtaining the images of strokes, a mathematical transformation for the images of strokes is required as depicted in the subsequent step 433. Actually, it should be noted that as the transformation can be performed in the subsequent handwriting recognition process, the mathematical transformation is not required during the handwriting input process.

When the user writes on the target area of the writing surface with the stylus having a special color point, the images captured by the digital camera 110 and the sounds received by the microphone 120 will be processed separately to produce video data corresponding to the images of strokes and audio data corresponding to the sounds (steps 430, 440).

The step 430 of obtaining the images of raw strokes is divided into 3 sub-steps, and is depicted as follows:

At step 431, a step of capturing and time-stamping images is performed. The digital camera takes images generally by the rate of 30 frames per second. In addition to a sequence of images within the target area of the writing surface captured by the digital camera, the images are time-stamped. Next, at step 432, a step of extracting images of raw strokes from the captured images is performed to filter out all irrelative images, not related to the strokes (e.g. images of hand and stylus), and leave only the locus of the special color point (or the light point) on the stylus, i.e. "raw strokes" by comparing the captured images of frames with the color of the special color point (or a light) on the stylus. At step 433, a mathematical transformation and normalization step of the images of raw strokes is performed, similar to the descriptions related to FIG. 5 mentioned above, to transform and normalize the time-stamped images of raw strokes in order to correct skew of the images of raw strokes when the digital camera takes images. Similarly, as the transformation can be performed in the subsequent handwriting recognition process, the step 433 is not required during the handwriting input process.

Figure 6:
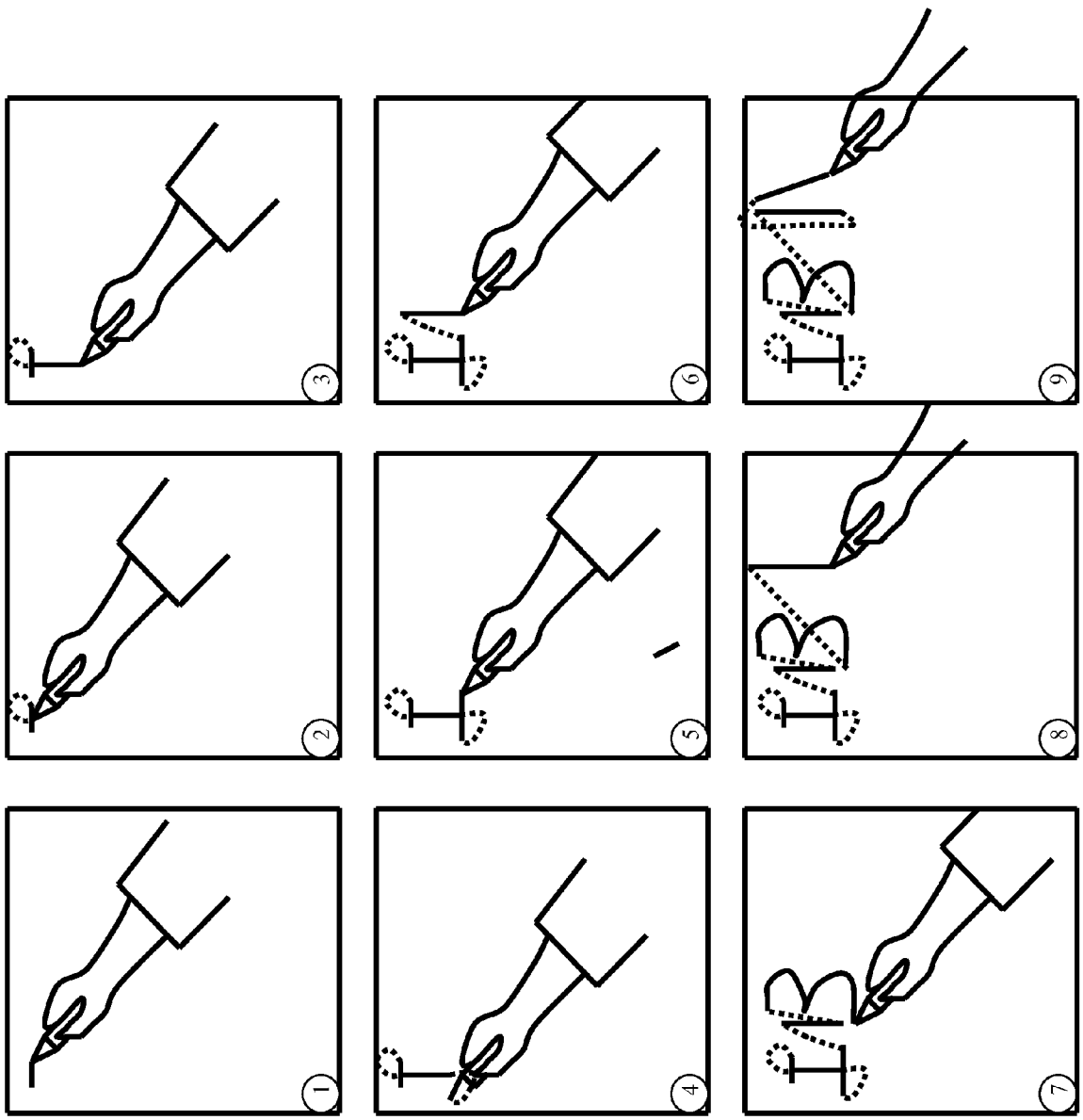
FIG. 6 depicts a sequence of image frames taken by the digital camera.

FIG. 6 depicts a sequence of image frames taken by the digital camera. As the digital camera takes images by the rate of 30 frames per second, only part of frames are shown in the FIG. 6. The digital camera captures all images shown in the view field within the target area. Accordingly, if the user writes on a writing surface, e.g. a paper, with an inked pen/stylus having a special color point (or a light point), which can write on a real paper, there should be the images of ink traces, the stylus, the "special color point (or a light point)" on the stylus and the user's hand actually shown in each frame.

For convenience to understand, the traces of the movement of the special color point (or the light point) in each frame of FIG. 6 are depicted as an "accumulated locus". The strokes shown in FIG. 6 include solid lines and broken lines, in which the ink traces of the pen represented by the solid lines overlaps the accumulated locus of the special color point (or a light point) on the stylus, and the broken lines represent the accumulated locus of the special color point (or a light point) on the stylus when the pen is lifted from the writing surface. Accordingly, shown in each frame of FIG. 6 will include the images of ink traces, the stylus, the "accumulated locus" of the special color point (or a light point) on the stylus and the user's hand, in which the "accumulated locus" of the special color point (or a light point) on the stylus constitutes the desired "raw strokes". The images of each frame will actually not include the images of the broken lines shown in FIG. 6, and will only show the special color point (or a light point) on the stylus at a certain position of broken lines.

By utilizing the special color (or light) of the special color point (or a light point) on the stylus, the present invention can be performed to easily filter out the images of ink traces, the stylus other than the special color point (or a light point) and the user's hand, and only leave the video data of the accumulated focus of the special color point (or a light point) into a storage. After performing the step 432, the video data stored in the storage correspond to the "raw strokes", i.e. the accumulated focus of the special color point (or a light point) on the stylus, which comprises the solid lines and the broken lines in the frame 9 of FIG. 6.

If the user writes on a non-paper writing surface with a stylus/pen having a special color point, there are not any ink traces of strokes. Accordingly, shown in frames taken by the digital camera will only include the stylus, the special color point (or the light point), and the image of the user's hand, without ink traces. The accumulated locus of the special color point (or the light point) on the stylus constitutes the desired raw strokes.

At step 440, a step of receiving and time-stamping writing sounds is performed to pick up the sounds of the movement of stylus 130 on the writing surface with the microphone. The sampling rate of sounds is 8000 Hz which is far larger than the rate of taking images with the digital camera (e.g. 30 frames/s mentioned above). When the invention is implemented, any other sampling rates of sounds far larger than the rate of images (or frames) taking are available, while not limited to be 8000 Hz mentioned above. Similarly, the sounds received by the microphone are also time-stamped. As depicted above, in case of a poor microphone, the user may need the kind of stylus comprising a micro-switch 160 and a built-in buzzer 170 as shown in FIG. 3.

At step 450, a final filtering step of retrieving effective strokes from the raw strokes is performed to remove normalized raw strokes corresponding to sound-non-existing periods and leave normalized effective strokes by comparing said time-stamped and normalized images of raw strokes with said time-stamped sounds by aligning time-stamps. If the user writes on a paper with an inked pen having a special color point 150, the ink traces on the paper correspond to the effective strokes mentioned above.

FIG. 7 depicts an example of performing step 450. When writing "I" on a writing surface, the images of raw stokes 700 captured by the digital camera 110 include solid lines ("I") and broken lines shown in FIG. 7, i.e. segments ① to ⑤ after completing step 430. In fact, the solid lines ("I") and the broken lines are the accumulated locus respectively when the stylus is brought into contact with the writing surface and when the stylus is lifted off the writing surface. The sound signals 710 picked up by the microphone 120 only appear on the periods ①, ③ and ⑤. The segments of the images of strokes ① to ⑤ respectively correspond to the periods of sound signals ① to ⑤. The periods ②④ indicate the sound-non-existing periods in which the stylus is lifted off the writing surface, and correspond to the segments ②④ of the broken lines of the images of strokes. Accordingly, after performing the step 450, segments ①, ③ and ⑤ with sounds signal associated will be left and stored by comparing the images of raw strokes with the sounds to remove the segments ②④ corresponding to the sound-non-existing periods ②④. The left segments ①, ③ and ⑤ constitute the desired "effective strokes" as the solid lines "I" shown in FIG. 7. Similarly, the raw strokes shown in FIG. 6 is processed after the step 450, the result will appear on FIG. 8 in which there are only the solid lines in FIG. 6 stored in a storage.

The effective strokes obtained by performing the step 450 will be fed to a handwriting recognition engine for recognition (Step 460). The object of the present invention is to provide effective strokes of handwriting input for recognition. Therefore, the handwriting recognition engine can be any suitable handwriting recognition system.

The present invention is to retrieve the accumulated locus (e.g. raw strokes) of a special color point (light point) on a stylus, other than the ink locus, and then extract the effective strokes from the raw strokes. Therefore, the method of handwriting input according to the present invention can be used for a real paper environment or for a non-paper environment on which there is not any ink trace of strokes.

Although the above illustrates the preferred embodiment of the present invention, it can be realized that the present invention can be implemented in hardware, software or any combination thereof. Therefore, there exist other changes in forms and details. For example, as an alternative, when the stylus is brought into contact with the writing surface, the digital camera is enabled, and when the stylus is lifted from the writing surface, the digital camera is disabled. As such, the stylus is lifted off the writing surface, the digital camera functioning is disabled from capturing images. The invention can be also implemented in this way to capture images, and then to retrieve the effective strokes. Accordingly, the filtering step 450 of retrieving effective strokes from raw strokes mentioned above can be omitted.

Additionally, according to an alternative of the present invention contrary to the embodiment shown in the FIG. 4, the images captured by the digital camera 110 and the sounds received by the microphone 120 will not firstly be processed separately (as steps 430, 440 shown in FIG. 4). According to the alternative embodiment, the invention is implemented by comparing the time-stamped images captured by the digital camera 110 with the time-stamped sounds received by the microphone 120 by aligning time-stamps to remove the images corresponding to sound-non-existing periods, and leave only the images of ink traces, the stylus, solid lines of an accumulated locus of a special color point (or a light point) on the stylus and the user's hand as shown in FIG. 6, in which the solid lines of an accumulated locus of a special color point (or a light point) on the stylus constitutes the desired "effective strokes". Next, a step of retrieving the effective strokes is directly performed to filter out all irrelative images, not related to the strokes (e.g. images of hand and stylus), and leave only the accumulated locus of the special color point (or the light point) on the stylus, i.e. the "effective strokes", by comparing the captured images of frames with the color of the special color point (or a light) on the stylus.

It is important to note that those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A video-based handwriting input method, comprising:
   while a user writes on a writing surface with a stylus having thereon a special mark, capturing images including raw strokes and receiving writing sounds generated through contact of the stylus with the writing surface;
   filtering the captured images to extract, from the captured images, images of raw strokes that contain the special mark on the stylus and to filter out captured images that do not contain the special mark; and
   retrieving effective strokes from the raw strokes by utilizing the received writing sounds.

2. The method of claim 1, further comprising a preliminary step of defining a target area for handwriting on the writing surface.

3. A video-based handwriting input method, comprising:
   capturing images including raw strokes and receiving writing sounds, when a user writes on a writing surface with a stylus having a special mark;
   extracting images of raw strokes from the captured images, wherein the captured images extracted as images of raw strokes are those images that contain the special mark on the stylus; and
   retrieving effective strokes from the raw strokes by utilizing the received writing sounds, wherein said retrieving includes removing raw strokes corresponding to periods in which no writing sounds are received and retaining effective strokes corresponding to periods in which writing sounds are received.

4. The method of claim 3, wherein said retrieving effective strokes includes comparing time-stamps of images of raw strokes with time-stamps of said received writing sounds.

5. The method according to claim 1, wherein said step of capturing images including raw strokes is performed by a digital camera.

6. The method according to claim 1, wherein said step of receiving writing sounds is performed by a microphone.

7. The method of claim 1, wherein said special mark is a point having a special color different from the colors of the writing environment, and the special color is changeable.

8. The method of claim 7, wherein said point having the special color is positioned at the tip of the stylus.

9. The method according to claim 1, wherein said special mark is a light point.

10. The method of claim 2, wherein said preliminary step of defining a target area for handwriting includes a step of transforming an image of a target area to a rectangle.

11. The method of claim 10, further comprising transforming and normalizing said images of raw strokes in order to correct skew of the images of raw strokes.

12. The method according to claim 1, further comprising a step of feeding said effective strokes to a handwriting recognition engine that recognizes text from the effective strokes.

13. The method according to claim 1, wherein said stylus further comprising a micro-switch and a buzzer.

14. A video-based handwriting input method, comprising:
capturing images including effective strokes and receiving writing sounds, when a user writes on a writing surface with a stylus having a special mark, said images and sounds being time-stamped;
removing from the captured images those images corresponding to periods in which the writing sounds are not received and recording the remaining images; and
retrieving effective strokes from the recorded images by comparing said recorded images with the special mark on the stylus.

15. The method of claim 14, further comprising a preliminary step of defining a target area for handwriting on the writing surface.

16. The method of claim 14, wherein said step of removing includes comparing time-stamps of said captured images with time-stamps of the received writing sounds.

17. The method according to claim 14, wherein said step of capturing images including effective strokes is performed by a digital camera.

18. The method according to claim 14, wherein said step of receiving writing sounds is performed by a microphone.

19. The method of claim 14, wherein said special mark is a point having a special color different from the colors of the writing environment, and the special color is changeable.

20. The method of claim 19, wherein said point having the special color is positioned at the tip of the stylus.

21. The method according to claim 14, wherein said special mark is a light point.

22. The method of claim 15, wherein said preliminary step of defining a target area for handwriting includes a step of transforming an image of target area to a rectangle.

23. The method of claim 22, further comprising transforming and normalizing said time-stamped images of effective strokes to correct skew of the images of effective strokes.

24. The method according to claim 14, further comprising a step of feeding said effective strokes to a handwriting recognition engine that recognizes text from the effective strokes.

25. The method according to claim 14, wherein said stylus further comprising a micro-switch and a buzzer.

26. A video-based handwriting input apparatus, comprising:
a stylus having a special mark thereon;
a camera that captures images including raw strokes of a user writing on a writing surface with the stylus;
a microphone that receives writing sounds generated through contact of the stylus with the writing surface; and
a processor that filters the captured images to extract, from the captured images, images of raw strokes that contain the special mark on the stylus and to filter out captured images that do not contain the special mark, wherein the processor retrieves effective strokes from the raw strokes by utilizing the received writing sounds.

27. A video-based handwriting input apparatus, comprising:
a stylus having a special mark;
a camera that captures images including raw strokes;
a microphone that receives writing sounds, when a user writes on a writing surface with said stylus having a special mark; and
a processor that extracts images of raw strokes by comparing the captured images with the special mark on the stylus and retrieves effective strokes from the raw strokes by utilizing the received writing sounds, wherein said processor removes raw strokes corresponding to periods in which writing sounds are not received and retains effective strokes corresponding to time periods in which writing sounds are received.

28. The handwriting input apparatus of claim 27, wherein said processor identifies the effective strokes by comparing time-stamps of images of raw strokes with time-stamps of the received writing sounds.

29. The handwriting input apparatus according to claim 26, wherein said camera is a digital camera.

30. The handwriting input apparatus of claim 26, wherein said special mark is a point having a special color different from the colors of the writing environment, and the special color is changeable.

31. The handwriting input apparatus of claim 30, wherein said point having the special color is positioned at the tip of the stylus.

32. The handwriting input apparatus according to claim 26, wherein said special mark is a light point.

33. The handwriting input apparatus according to claim 26, wherein the processor transforms an image of a target area to a rectangle.

34. The handwriting input apparatus of claim 33, wherein the processor transforms and normalizes said images of raw strokes to correct skew of the images of raw strokes.

35. The handwriting input apparatus according to claim 26, wherein the processor includes a handwriting recognition engine that recognizes text from said effective strokes.

36. The handwriting input apparatus according to claim 26, wherein said stylus further comprising a micro-switch and a buzzer.

37. A video-based handwriting input apparatus, comprising:
a stylus having a special mark;
a camera that captures images including effective strokes;
a microphone that receives writing sounds, when a user writes on a writing surface with said stylus having a special mark;
a processor that removes captured images corresponding to periods in which no writing sounds are received and retrieves effective strokes from the captured images by comparing said captured images with the special mark on the stylus.

38. The handwriting input apparatus of claim 37, wherein said processor removes the captured images corresponding to periods in which no writing sounds are received by comparing time-stamps of the captured images with time-stamps of the received writing sounds.

39. The handwriting input apparatus according to claim 37, wherein said camera is a digital camera.

40. The handwriting input apparatus of claim 37, wherein said special mark is a point having a special color different from the colors of the writing environment, and the special color is changeable.

41. The handwriting input apparatus of claim 40, wherein said point having the special color is positioned at the tip of the stylus.

42. The handwriting input apparatus according to claim 37, wherein said special mark is a light point.

43. The handwriting input apparatus of claim 37, wherein the processor transforms an image of a target area to a rectangle.

44. The handwriting input apparatus of claim 43, wherein the processor transforms and normalizes said images of effective strokes to correct skew of the images of effective strokes.

45. The handwriting input apparatus according to claim 37, further comprising a handwriting recognition engine that recognizes text from said effective strokes.

46. The handwriting input apparatus according to claim 37, wherein said stylus further comprising a micro-switch and a buzzer.

47. A program product for video-based handwriting input, comprising: a non-transitory computer-readable storage medium; and program code stored within the computer-readable storage medium that, when executed by a computer, causes the computer to perform:

while a user writes on a writing surface with a stylus having thereon a special mark, capturing images including raw strokes and receiving writing sounds generated through contact of the stylus with the writing surface;

filtering the captured images to extract, from the captured images, images of raw strokes that contain the special mark on the stylus and to filter out captured images that do not contain the special mark; and retrieving effective strokes from the raw strokes by utilizing the received writing sounds.

48. A program product for video-based handwriting input, comprising: a non-transitory computer-readable storage medium; and program code stored within the computer-readable storage medium that, when executed by a computer, causes the computer to perform:

capturing images including effective strokes and receiving writing sounds, when a user writes on a writing surface with a stylus having a special mark, said images and sounds being time-stamped;

removing from the captured images those images corresponding to periods in which the writing sounds are not received and recording the remaining images; and retrieving effective strokes from the recorded images by comparing said recorded images with the special mark on the stylus.

\* \* \* \* \*